United States Patent
Hennecke et al.

(10) Patent No.: US 9,641,053 B2
(45) Date of Patent: May 2, 2017

(54) CONNECTING ELEMENT BETWEEN A MOTOR AND A CONTROL UNIT

(75) Inventors: Thomas Hennecke, Leinfelden (DE); Andre Skuppin, Sachsenheim (DE); Stephan Urban, Ohmden (DE)

(73) Assignee: Robert Bosch GmbH, Stuttgart (DE)

( * ) Notice: Subject to any disclaimer, the term of this patent is extended or adjusted under 35 U.S.C. 154(b) by 786 days.

(21) Appl. No.: 13/409,498

(22) Filed: Mar. 1, 2012

(65) Prior Publication Data

US 2012/0223604 A1    Sep. 6, 2012

(30) Foreign Application Priority Data

Mar. 1, 2011 (DE) .......................... 10 2011 004 919

(51) Int. Cl.
*H02K 5/10* (2006.01)
*H02K 11/33* (2016.01)
*H02K 5/22* (2006.01)

(52) U.S. Cl.
CPC ............... *H02K 11/33* (2016.01); *H02K 5/10* (2013.01); *H02K 5/225* (2013.01)

(58) Field of Classification Search
CPC .......... H02K 5/12; H02K 5/124; H02K 5/225; H02K 1/132; H02K 5/10; H02K 11/0073; H02K 5/15; H02K 11/0068; H02K 5/128; H02K 2005/1287; H02K 5/14; H02K 5/152; B62D 5/0406

USPC ................................................... 310/71, 68 R
See application file for complete search history.

(56) References Cited

U.S. PATENT DOCUMENTS

| 2,763,214 A | * | 9/1956 | White ........................... 417/357 |
| 4,834,202 A | * | 5/1989 | Shimizu ....................... 180/444 |
| 6,429,553 B1 | * | 8/2002 | Taniguchi et al. ........... 310/67 R |
| 2006/0006094 A1 | * | 1/2006 | Hofmann et al. ............ 206/706 |
| 2007/0138748 A1 | * | 6/2007 | Orlowski et al. ............. 277/412 |
| 2010/0289388 A1 | * | 11/2010 | Kimmich et al. .......... 310/68 D |
| 2011/0012451 A1 | * | 1/2011 | Bitzer ............................ 310/71 |

FOREIGN PATENT DOCUMENTS

DE  10 2006 026 403 A1  1/2008
DE  10 2008 054 527 A1  6/2010

OTHER PUBLICATIONS

DE 202008054527 machine translation of document submitted by Applicant.*
IQIPquickqueryexport, Jan. 4, 2017.*

* cited by examiner

*Primary Examiner* — Terrance Kenerly
(74) *Attorney, Agent, or Firm* — Maginot, Moore & Beck LLP

(57) ABSTRACT

A connecting element between a motor and a control unit includes a flat base plate having contact elements and an, in particular centered, opening. The base plate further includes a shaft around the opening. A first seal is provided at the edge of the base plate and a second seal is provided at the upper edge of the shaft.

13 Claims, 4 Drawing Sheets

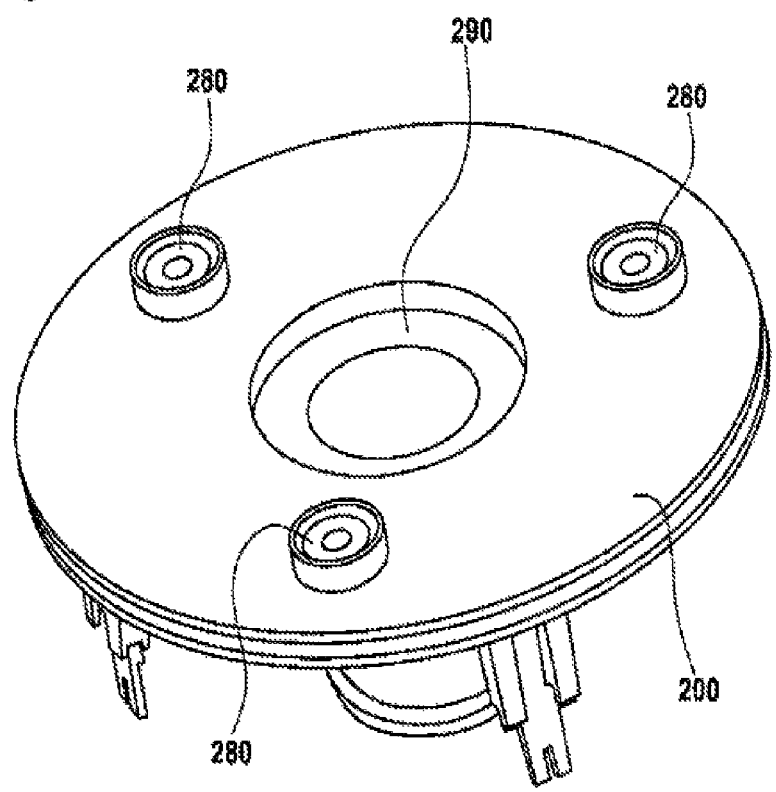

CONNECTING ELEMENT BETWEEN A MOTOR AND A CONTROL UNIT

This application claims priority under 35 U.S.C. §119 to German patent application no. DE 102011004919.3, filed Mar. 1, 2011 in Germany, the disclosure of which is incorporated herein by reference in its entirety.

BACKGROUND

The present disclosure relates to a connecting element which can be inserted between a motor and a control unit, and to an assembly comprising the motor, the connecting element and the control unit.

When developing motors, the size is an important property, in addition to the expected power output. In order to produce electric motors which are as small as possible, it has proven advantageous to at least partially physically separate the mechanical and electronic components. However, in order to produce a complete assembly comprising a motor and control unit, it is necessary to develop suitable connecting elements which allow these two elements to be combined.

DE 10 2006 026 403 A1 discloses a circuit mount on which actuation electronics for an electric motor are mounted. In order to accommodate a bearing of the electric motor, the circuit mount has a deep-drawn receptacle in the center. Together with a cover over the circuit mount, this design forms an end plate of the electric motor, which end plate closes off the housing of the electric motor on one side.

A further design of an electric motor with associated electronics is described in DE 10 2008 054 527 A1. In this design, the connection between the motor housing and the bearing plate which contains the electronics is achieved by means of welding or a shrink-fitting process.

SUMMARY

When electric motors are used for a very wide variety of applications, various requirements to have to be met. In addition to thermal and vibrational loads, a high level of resistance to media also has to be provided. For example, in the event of corresponding use of the electric motors, for example as a steering motor in a steering system, care should be taken that the mechanical and electronic components are protected by suitable measures (solid and/or liquid sealing). Care should be taken that the necessary requirements in respect of the protective class are complied with, particularly at the interfaces between these components.

The present disclosure describes a connecting element which is suitable for providing appropriate protection against the undesired ingress and/or propagation of media at an interface of the above kind in order to meet the desired requirements in respect of leaktightness.

This is achieved by the connecting element, which is provided between the motor and the control unit, having at least two seals in order to efficiently impede any possible flow of media. In this case, the connecting element has a flat base plate in which contact elements and a shaft which is arranged around an opening are provided. While the contact elements are used to actuate the electric motor, the opening is required for the position sensor which is mounted on the rotor to pass through. Therefore, in order to achieve the required sealing, a first seal is provided which is arranged at the edge of the base plate, while a second seal is fitted at the upper edge of the shaft.

Simple and efficient sealing can be achieved by these seals by virtue of the connecting element being positioned in an upper recessed region of the motor with subsequent mounting of the control unit. This sealing operation creates a barrier which makes it difficult or impossible for a liquid to enter the control unit via the motor.

A further refinement of the disclosure in which not only the outer region around the base plate and the opening but also the contact elements are sealed off is particularly advantageous. To this end, the base plate is used as an insulation displacement connection ("IDC") adapter plate, that is to say as a base plate with insulation-displacement and welded connections. In this case, a third seal is optionally used, said third seal being specially arranged in the region of the contact elements. One option for this seal is the use of molded seals, for example in the form of press-in seals. These molded seals can be introduced into the passage holes and be of flexible design, and therefore the electrical contact-making means can be inserted from the upper face and lower face of the base plate. However, as an alternative, the press-in seals can also be introduced together with one of the electrical contacts from the upper face or lower face and then be fixed. The electrical contact is then made from the electric motor to the base plate in the form of a welded or clamping contact and from the base plate to the control unit in the form of an insulation-displacement contact.

In one development of the disclosure, the third seal projects beyond the base plate. In this case, provision can be made for the seal to be enclosed at least on one side of the base plate. A refinement of this kind can be used to ensure that a sufficient amount of material is introduced into the passage opening in order to achieve the desired sealing effect.

It is particularly advantageous for the base plate to be of round or at least oval shape. The edge of the base plate can optionally also be formed as a bead. In contrast, it is also advantageous for the shaft to likewise be of round design.

O-rings can be used for the seals if said base plate and/or shaft have/has a round or oval shape. Said O-rings can be placed directly on the edge regions of the base plate or of the shaft. However, provision may also be made for receptacles, for example in the form of beads or recesses, to be provided, these preventing the O-rings from slipping when they are mounted.

Overall, the static seals according to the disclosure present a more robust alternative compared to dynamic seals. Furthermore, any losses in torque which may occur are avoided in comparison to dynamic seals.

Further advantages can be found in the following description of exemplary embodiments.

BRIEF DESCRIPTION OF THE DRAWINGS

In contrast.

FIGS. 3a and 3b show a detailed illustration of the connecting element.

DETAILED DESCRIPTION

Splitting the mechanical electric motor component and electronic control components into different elements makes it necessary to provide suitable connecting elements for connecting these components.

Figure 1:
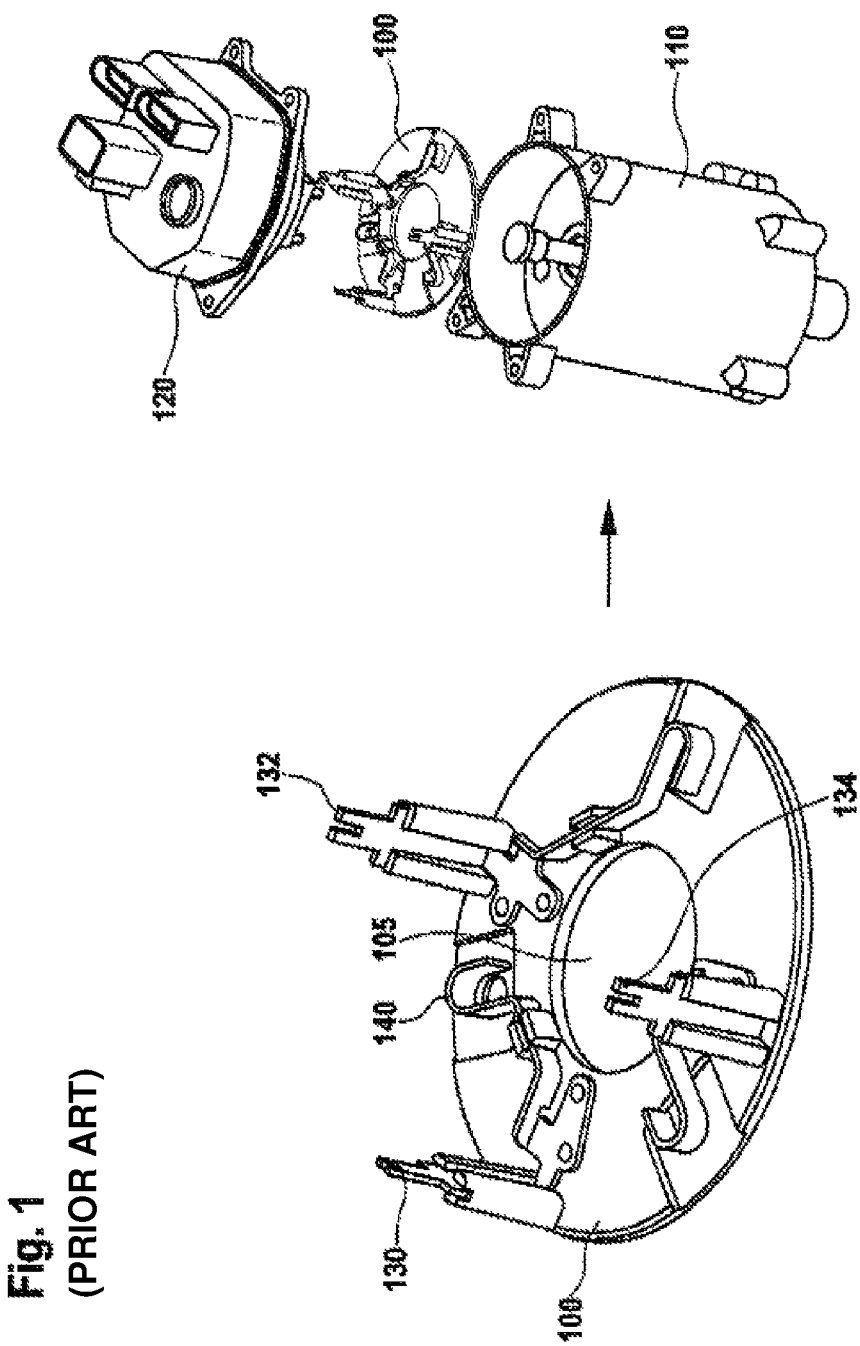
FIG. 1 shows the customary assembly of an assembly comprising a motor, a connecting element and a control unit.

FIG. 1 shows, by way of example, a possible design of an assembly according to the prior art comprising an electric motor 110 and a control unit 120, in which design the control unit is at least partially recessed in the upper region of the electric motor and is screw-connected to said electric motor. A base plate 100 which has three contact elements 130 to 134, for example for a three-phase electric motor, is used for the internal assembly. Electrical contact-connections between the control unit 120 and the electric motor 110 can be established through corresponding holes 140 in the base plate. An opening 105 is provided in the center of the base plate 100, the rotor with the position sensor positioned on it passing through said opening. This rotor, as part of the shaft of the electric motor, is used, together with the position sensor which can obviously also be positioned in the control unit 120, to establish the position of the rotor in order to control, in an optimum manner, start-up of the motor by means of actuation via the three phases.

As can therefore be seen in FIG. 1, various ways (edge region of the base plate, central opening and passage opening in the contact-making means) for liquid which has entered to pass from the motor, along the shaft, to the connections of the control unit 120 are present between the electric motor 110 and the control unit 120.

Figure 2:
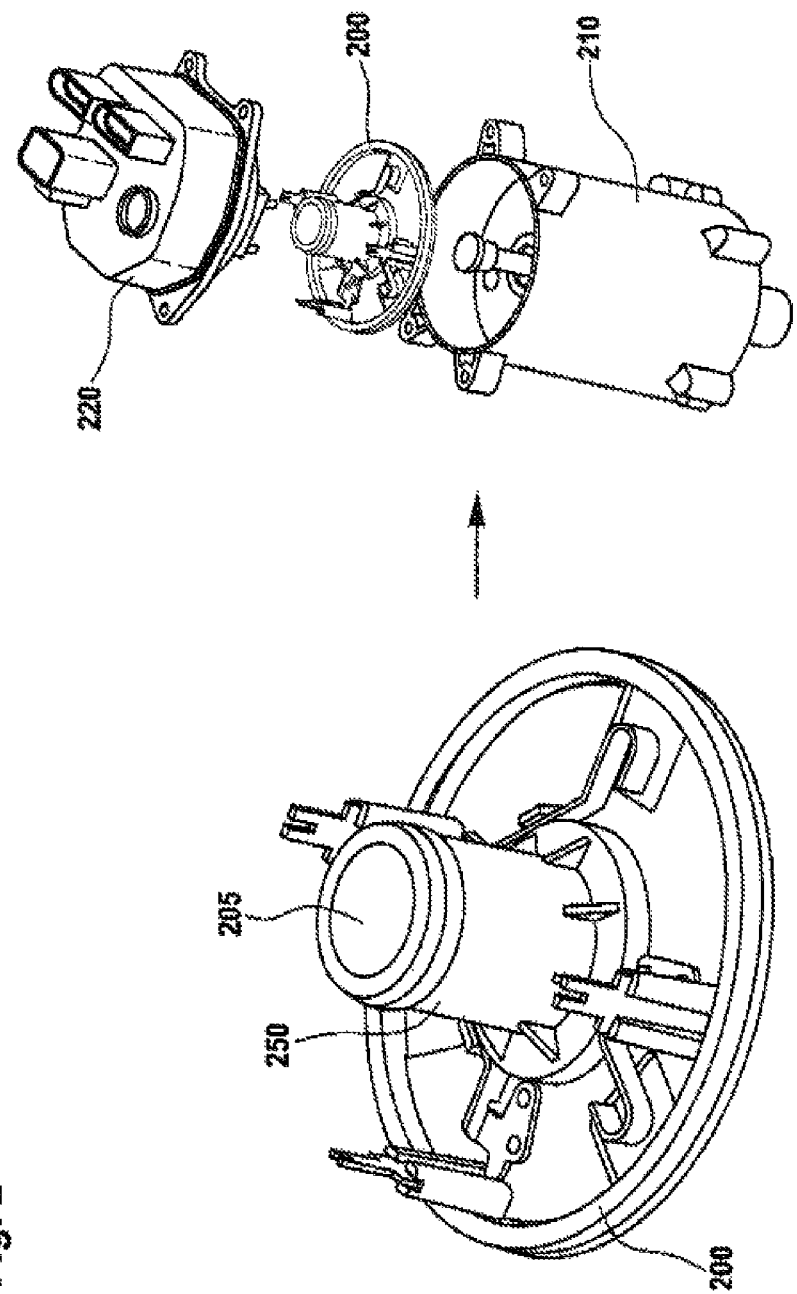
FIG. 2 shows the assembly with the connecting element according to the disclosure.
Figure 3A:
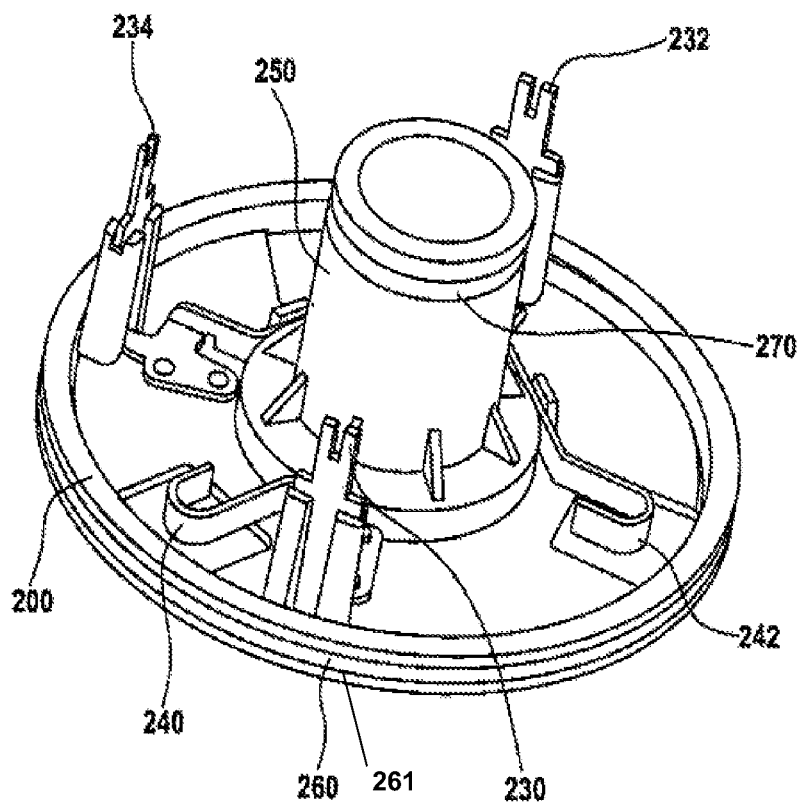

Seals according to FIGS. 2 and 3a and 3b are provided in order to close these points of possible media passage. Firstly, FIG. 2 shows that substantially no modifications have to be made to the electric motor 210 or to the control unit 220. Major modifications are made only to the base plate 200 which is in the form of an IDC adapter plate.

A first seal 260 in the form of an O-ring is fitted in the edge region of the base plate 200. A bead or recess 261 into which the O-ring is recessed can optionally be provided for the purpose of better guidance as best shown in FIG. 3a. This O-ring provides lateral sealing in the recessed region between the base plate 200 and the housing of the electric motor 210. Furthermore, the central opening 205 is provided with a shaft 250 in contrast to the version according to FIG. 1. Said shaft is used to arrange the second seal 270, which is intended to seal off this opening 205, at a level which is elevated in relation to the base plate 200, in order to allow sealing between the base plate and the control unit. To this end, an O-ring is likewise arranged in the upper region of the shaft 250. In this case, the second seal 270 can be provided both in the interior of the shaft 250 and outside. Fitting the second seal 270 on the outside has purely practical advantages since the second seal 270 or the O-ring can be press-fitted in a simple and force-fitting manner by corresponding shaping of the lower face of the control unit 220.

The third possible seal 280 relates to the through-plating which is necessary for the electrical connection between the electric motor 210 and the control unit 220. To this end, three contact elements 230 to 234, one for each (actuation) phase, are mounted on the base plate 200 according to the present exemplary embodiment, said contact elements establishing a welded connection to the electric motor and an insulation-displacement connection to the control unit 220. Openings 240 and 242 (the opening for the contact element 234 is concealed) are provided in order to pass the electrical connections through the base plate 200, said openings being closed by means of the third seal 280. The sealed-off contact elements can be clearly seen on the lower face of the base plate 200 according to FIG. 3b. These third seals are designed such that a sealed-off electrical connection from the electric motor to the contact elements 230 to 234 can be established on the other side.

Suitable third seals 280 are molded seals which are inserted or pressed into the opening. In this case, provision can be made for the seals to be of flexible design and to be matched to the shape of the contact elements 230 to 234 of the front face and/or to the corresponding contact pins of the electric motor. However, as an alternative, provision can also be made for the third seals 280 to be introduced from the front face together with the contact elements 230 to 234 and then to be hardened. Care should be taken here that contact can be made with the contact elements on the front face from the rear face without damaging the seal. The third seals can also optionally be designed as O-rings.

FIG. 3b further shows that the third seals 280 are provided with a collar. This collar is used firstly to gather any excess sealing material and/or to ensure that a sufficient amount of sealing material can be introduced into the passage openings. Secondly, this collar also serves to protect the electrical contact-making means from the ingress of moisture or liquid between the connecting element 200 and the motor 210.

A fourth seal 290 can be provided in a further exemplary embodiment, said fourth seal being introduced into the recess at the base of the shaft 250 on the rear face of the base plate 200. Placing this fourth seal of the base plate on the base of the recessed region of the motor 210 can additionally or alternatively seal the contact-making means from the shaft or from the rotor.

What is claimed is:

1. A connecting element between a motor and a control unit, comprising:
a flat base plate including contact elements configured to electrically connect the motor to the control unit, an opening, and a shaft around the opening extending from a face of the flat base plate that faces away from the motor,
wherein a first seal is provided at an edge of the flat base plate and a second seal is provided at an upper edge of the shaft.

2. The connecting element according to claim 1, wherein the contact elements each have a third seal.

3. The connecting element according to claim 2, wherein the third seal projects at least partially beyond a side of the flat base plate.

4. The connecting element according to claim 2, wherein the third seals are each press-in seals.

5. The connecting element according to claim 1, wherein the flat base plate has a round shape, and the first seal is an O-ring.

6. The connecting element according to claim 1, wherein:
the flat base plate defines a recess in an edge region of the flat base plate, and
the first seal is inserted into said recess.

7. The connecting element according to claim 1, wherein the shaft has a round shape, and the second seal is an O-ring.

8. The connecting element according to claim 7, wherein the second seal is arranged in an outer region of the shaft.

9. The connecting element according to claim 1, wherein the opening is centered in the flat base plate.

10. An assembly comprising:
a motor;
a control unit configured to electrically connect to the motor; and
a connecting element including (i) a flat base plate, (ii) contact elements configured to electrically connect the motor to the control unit and (iii) an opening;
wherein the flat base plate has a shaft around the opening extending from a face of the flat base plate that faces away from the motor, wherein the motor includes an upper recessed region, the connecting element and the control unit positioned in the upper recessed region of the motor, wherein the connecting element is introduced into the recessed region, and wherein a first seal is provided at an edge of the flat base plate and a second seal is provided at an upper edge of the shaft.

11. The assembly according to claim 10, wherein each of the contact elements is configured to provide a separate electrical connection between the control unit and the motor.

12. The assembly according to claim 10, wherein the seals prevent liquid being exchanged between the upper region in the motor and the control unit.

13. The assembly according to claim 10, wherein the opening is centered in the flat base plate.

* * * * *